United States Patent
Lin et al.

(10) Patent No.: US 9,923,384 B2
(45) Date of Patent: Mar. 20, 2018

(54) METHOD FOR PERFORMING EFFICIENCY OPTIMIZATION OF AN ELECTRONIC DEVICE, AND ASSOCIATED APPARATUS

(71) Applicant: MEDIATEK INC., Hsin-Chu (TW)

(72) Inventors: Hung-Chih Lin, Yunlin County (TW); Hao-Ping Hong, Hsinchu County (TW)

(73) Assignee: MediaTek Inc., Hsin-Chu (TW)

( * ) Notice: Subject to any disclaimer, the term of this patent is extended or adjusted under 35 U.S.C. 154(b) by 184 days.

(21) Appl. No.: 14/715,570

(22) Filed: May 18, 2015

(65) Prior Publication Data
US 2015/0340877 A1 Nov. 26, 2015

Related U.S. Application Data

(60) Provisional application No. 62/000,576, filed on May 20, 2014.

(51) Int. Cl.
*H02J 5/00* (2016.01)
*H02J 50/10* (2016.01)
*H02J 50/12* (2016.01)
*H02J 7/02* (2016.01)

(52) U.S. Cl.
CPC .............. *H02J 5/005* (2013.01); *H02J 50/10* (2016.02); *H02J 50/12* (2016.02); *H02J 7/025* (2013.01)

(58) Field of Classification Search
CPC . H02J 5/005; H02J 7/025; H02J 17/00; H01F 38/14; H02M 2001/0032
USPC .......... 307/104; 323/282; 324/684; 363/101
See application file for complete search history.

(56) References Cited

U.S. PATENT DOCUMENTS

| | | | |
|---|---|---|---|
| 7,638,991 B1 | 12/2009 | Kobayashi | |
| 7,741,822 B2 | 6/2010 | Chen | |
| 2006/0038543 A1 | 2/2006 | Hazucha | |
| 2011/0156489 A1* | 6/2011 | Kim ................... | H04B 5/0075 307/104 |
| 2011/0157934 A1* | 6/2011 | Clemo .................. | H02J 1/102 363/71 |
| 2012/0195081 A1* | 8/2012 | Reddy .................... | H02M 7/23 363/67 |

(Continued)

FOREIGN PATENT DOCUMENTS

CN 103414260 A 11/2013

OTHER PUBLICATIONS

European Search Report dated Oct. 19, 2015 from corresponding European Patent Application No. EP15168226.7.

*Primary Examiner* — Thienvu Tran
*Assistant Examiner* — David M Stables
(74) *Attorney, Agent, or Firm* — Wolf, Greenfield & Sacks, P.C.

(57) ABSTRACT

A method for performing efficiency optimization of an electronic device and an associated apparatus are provided, where the method includes the steps of: performing at least one detection operation according to at least one signal of the electronic device to generate at least one detection result; and selecting a rectifier size of a plurality of rectifier sizes of a configurable rectifier within the electronic device according to the at least one detection result, to control the configurable rectifier to operate with the rectifier size, wherein the configurable rectifier is arranged for performing rectification operations, and the configurable rectifier is configurable to operate with at least one portion of the configurable rectifier being activated.

19 Claims, 8 Drawing Sheets

(56) References Cited

U.S. PATENT DOCUMENTS

| | | |
|---|---|---|
| 2012/0293009 A1 | 11/2012 | Kim et al. |
| 2012/0314465 A1* | 12/2012 | Matsui .................... H02J 5/005 363/71 |
| 2013/0249299 A1 | 9/2013 | Shijo et al. |

* cited by examiner

METHOD FOR PERFORMING EFFICIENCY OPTIMIZATION OF AN ELECTRONIC DEVICE, AND ASSOCIATED APPARATUS

CROSS REFERENCE TO RELATED APPLICATIONS

This application claims the benefit of U.S. Provisional Application No. 62/000,576, which was filed on May 20, 2014, and is included herein by reference.

BACKGROUND

The present invention relates to power loss control of a power transfer system, and more particularly, to a method for performing efficiency optimization of an electronic device, and an associated apparatus.

According to the related art, a conventional wireless power transfer system may comprise a conventional wireless power transmitter that is arranged to charge a conventional electronic device wirelessly. As various electronic products that are useful may be available on the market, the user may own a plurality of conventional electronic devices respectively corresponding to different wireless charging standards. As a result, some problems may occur. For example, the user typically needs to prepare a plurality of conventional wireless power transmitters respectively corresponding to the aforementioned different wireless charging standards, for use of wirelessly charging the plurality of conventional electronic devices, respectively, and therefore the related costs may be increased. In another example, in a situation where the user owns a plurality of conventional wireless power transmitters respectively corresponding to the aforementioned different wireless charging standards, for use of wirelessly charging the plurality of conventional electronic devices, respectively, the user may feel confused since two or more conventional wireless power transmitters within the plurality of conventional wireless power transmitters may look very much alike. In another example, in a situation where the user owns a plurality of conventional wireless power transmitters respectively corresponding to the aforementioned different wireless charging standards, for use of wirelessly charging the plurality of conventional electronic devices, respectively, the user may need more space for storage of the plurality of conventional wireless power transmitters. Thus, a novel method and associated architecture are required to enhance the compatibility of a wireless power transfer system without degrading the overall performance.

SUMMARY

It is an objective of the claimed invention to provide a method for performing efficiency optimization of an electronic device, and an associated apparatus, in order to solve the above-mentioned problems.

It is another objective of the claimed invention to provide a method for performing efficiency optimization of an electronic device, and an associated apparatus, in order to enhance the compatibility of a wireless power transfer system without degrading the overall performance.

It is another objective of the claimed invention to provide a method for performing efficiency optimization of an electronic device, and an associated apparatus, in order to enhance the overall performance of a system comprising the electronic device, no matter whether this system is a wireless power transfer system or not.

According to at least one preferred embodiment, a method for performing efficiency optimization of an electronic device is provided, where the method comprises the steps of: performing at least one detection operation according to at least one signal of the electronic device to generate at least one detection result; and selecting a rectifier size of a plurality of rectifier sizes of a configurable rectifier within the electronic device according to the at least one detection result, to control the configurable rectifier to operate with the rectifier size. More particularly, the configurable rectifier is arranged for performing rectification operations, and the configurable rectifier is configurable to operate with at least one portion of the configurable rectifier being activated.

According to at least one preferred embodiment, an apparatus for performing efficiency optimization of an electronic device is provided, where the apparatus comprises at least one portion of the electronic device. The apparatus may comprise a detection module and a configurable rectifier that are positioned within the electronic device, and may further comprise a controller that is coupled to the detection module and the configurable rectifier. The detection module is arranged for performing at least one detection operation according to at least one signal of the electronic device to generate at least one detection result. In addition, the configurable rectifier is arranged for performing rectification operations, wherein the configurable rectifier is configurable to operate with at least one portion of the configurable rectifier being activated. Additionally, the controller is arranged for selecting a rectifier size of a plurality of rectifier sizes of the configurable rectifier according to the at least one detection result, to control the configurable rectifier to operate with the rectifier size.

It is an advantage of the present invention that the present invention method and the associated apparatus can enhance the overall performance of a system comprising the electronic device, no matter whether this system is a wireless power transfer system or not. In addition, in a situation where this system is a wireless power transfer system, the present invention method and the associated apparatus can enhance the overall performance of the wireless power transfer system and are helpful on solving the related art problems. For example, when the wireless power transfer system is designed to be equipped with the capability of supporting various wireless charging standards, the present invention method and the associated apparatus can optimize the efficiency of a synchronous rectifier in a wireless power receiver within the wireless power transfer system.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
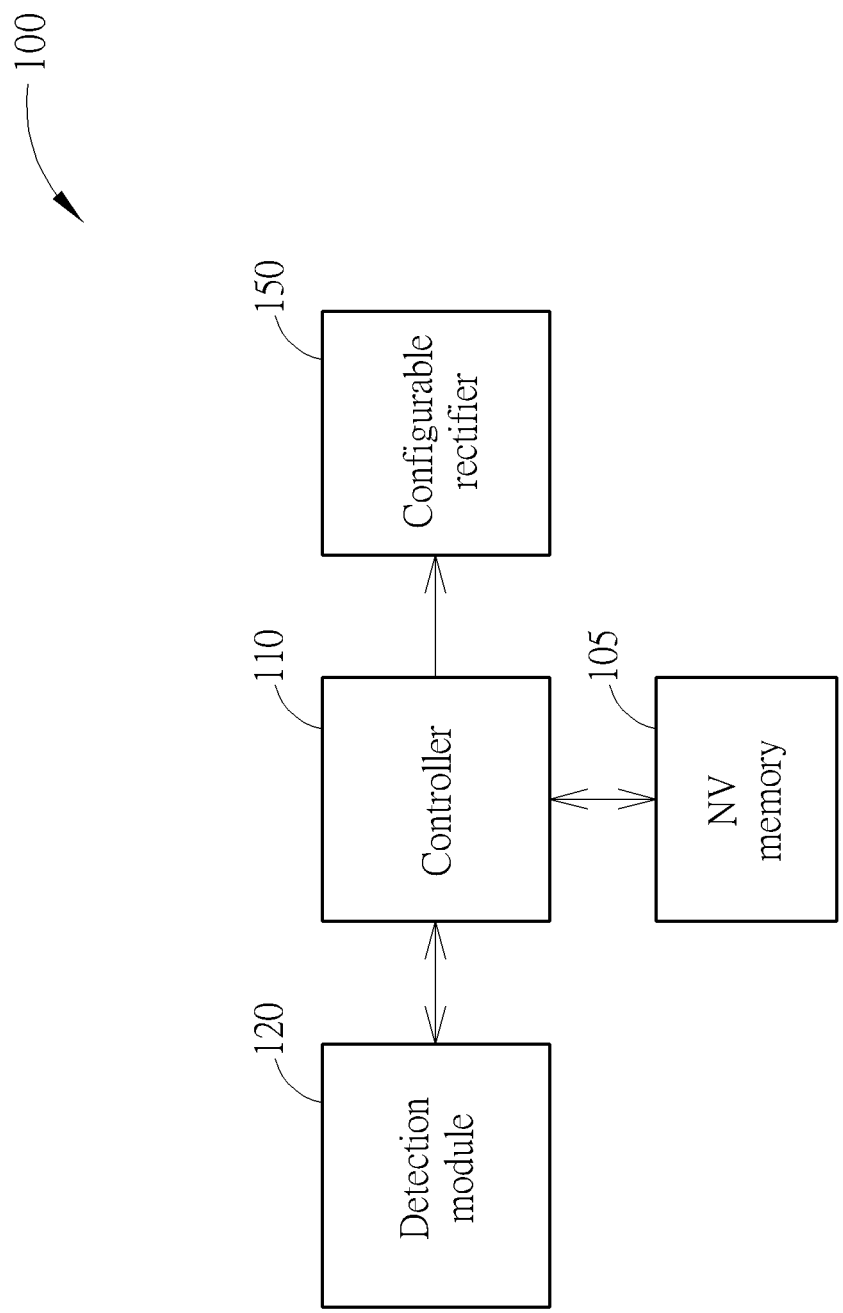
FIG. 1 is a diagram of an apparatus for performing efficiency optimization of an electronic device according to a first embodiment of the present invention.

FIG. 1 illustrates a diagram of an apparatus 100 for performing efficiency optimization of an electronic device according to a first embodiment of the present invention, where the apparatus 100 may comprise at least one portion (e.g. a portion or all) of the electronic device. For example, the apparatus 100 may comprise a portion of the electronic device mentioned above, and more particularly, can be at least one hardware circuit such as at least one integrated circuit (IC) within the electronic device and associated circuits thereof. In another example, the apparatus 100 can be the whole of the electronic device mentioned above. In another example, the apparatus 100 may comprise a system comprising the electronic device mentioned above (e.g. a wireless power transfer system comprising the electronic device). Examples of the electronic device may include, but not limited to, a mobile phone (e.g. a multifunctional mobile phone), a personal digital assistant (PDA), and a personal computer such as a laptop computer.

As shown in FIG. 1, the apparatus 100 may comprise a non-volatile (NV) memory 105 (e.g. an electrically erasable programmable read only memory (EEPROM), or a Flash memory), a controller 110 (e.g. a microprocessor), a detection module 120, and a configurable rectifier 150, where the controller 110 is coupled to the NV memory 105, the detection module 120, and the configurable rectifier 150. For example, the electronic device may comprise, or may be equipped with, a power input coil (not shown in FIG. 1), and the apparatus 100 may further comprise a communications module (not shown in FIG. 1) that is coupled to each of the power input coil of the electronic device and the controller 110, and more particularly, the detection module 120 may be coupled to the power input coil of the electronic device. This is for illustrative purposes only, and is not meant to be a limitation of the present invention. According to some embodiments of the present invention, it is unnecessary that the electronic device comprises (or is equipped with) the power input coil mentioned above and that the apparatus 100 comprises the communications module mentioned above. For example, the apparatus 100 of one of these embodiments may be positioned within an alternating current (AC) -direct current (DC) synchronous rectifier system, the apparatus 100 of another of these embodiments may be positioned within a charger system, the apparatus 100 of yet another of these embodiments may be positioned within a power switch system. In some embodiments, the apparatus 100 may be positioned within a resonant coupling system, an inductive coupling system, an in-band communications system, or an out-band communications system.

According to the embodiment shown in FIG. 1, the NV memory 105 is arranged to store information for the electronic device, such as configuration information of the configurable rectifier 150, and the controller 110 is capable of configuring the configurable rectifier 150, and more particularly, is capable of performing efficiency optimization of the electronic device with aid of the detection module 120 and the configurable rectifier 150. For example, in the aforementioned situation where the electronic device comprises (or is equipped with) the power input coil, the information stored in the NV memory 105 may comprise predetermined information regarding wireless charging, and the controller 110 may be arranged to perform wireless charging control of the electronic device. In addition, the detection module 120 is arranged to perform detection operations for the controller 110. More particularly, the detection module 120 may be arranged to perform charging-detection operations according to one or more induced signals of the power input coil of the electronic device, and the communications module may be arranged to wirelessly communicate with an external device (which is positioned outside the electronic device) for the controller 110 by utilizing the power input coil of the electronic device. Further, the configurable rectifier 150 is configurable to allow at least one portion (e.g. a portion or all) of the configurable rectifier to be selectively activated. For example, the configurable rectifier 150 is configurable to allow a plurality of rectifier sub-circuits (not shown in FIG. 1) within the configurable rectifier 150 to be selectively activated or inactivated, respectively. Therefore, the configurable rectifier 150 may be set to operate (e.g. perform rectification operations) with one of a plurality of rectifier sizes (which are typically different from each other) when needed.

For example, according to at least one detection result of the detection operations (e.g. frequency detection operations) that is obtained from the detection module 120, the controller 110 may correctly determine and select a candidate operation mode of a plurality of candidate operation modes for a wireless charging receiver (not shown in FIG. 1) of the electronic device, where the plurality of candidate operation modes may corresponding to different wireless charging standards (or specifications), respectively, such as the Wireless Power Consortium (WPC) Qi V1.1 standard, the Power Matters Alliance (PMA) standard, the Alliance for Wireless Power (A4WP) standard, etc. Therefore, the controller 110 is capable of determining a set of program codes within multiple sets of program codes (which may be stored in the NV memory 105 in advance) to be an active set of program codes, and loading this set of program codes from the NV memory 105, to control wireless charging operations of the electronic device. Thus, by providing the plurality of candidate operation modes in which any operation mode may be selectively applied, the wireless power transfer system may be equipped with the capability of supporting various wireless charging standards. Regarding some implementation details of designing the wireless power transfer system to be equipped with the capability of supporting various wireless charging standards, please refer to some previously filed U.S. provisional/non-provisional applications of MEDIATEK INC.

As a result of running the active set of program codes, the controller 110 may correctly perform input power estimation in a situation where the electronic device is charged wirelessly, and more particularly, to generate accurate information regarding the power that is received through wireless charging, and to perform wireless charging foreign object detection (FOD). Regarding implementation details of the wireless charging FOD mentioned above, please refer to, for example, the WPC Qi V1.1 standard for more information.

Please note that, based on the aforementioned at least one detection result of the detection operations, the controller 110 may correctly configure the configurable rectifier 150 according to at least one portion (e.g. a portion or all) of a plurality of predetermined relationships between the plurality of rectifier sizes and a plurality of predetermined modes. For example, the plurality of predetermined modes may represent the plurality of candidate operation modes of the wireless charging receiver. As a result, the controller 110 may activate at least one portion (e.g. a portion or all) of the plurality of rectifier sub-circuits to control the configurable rectifier 150 to operate with the specific rectifier size. This is for illustrative purposes only, and is not meant to be a limitation of the present invention.

In practice, the plurality of predetermined relationships may be obtained from theoretical calculations and/or experimental results, to allow the power loss of the wireless charging receiver (e.g. switching loss and/or conduction loss within the configurable rectifier 150) to be always minimized, no matter whether the wireless charger complies with which of the aforementioned different wireless charging standards. Therefore, in a situation where the wireless power transfer system is designed to be equipped with the capability of supporting various wireless charging standards, the apparatus 100 can optimize the efficiency of the wireless power receiver, and more particularly, can optimize the efficiency of the configurable rectifier 150 (e.g. a synchronous rectifier) in the wireless power receiver.

Figure 2:
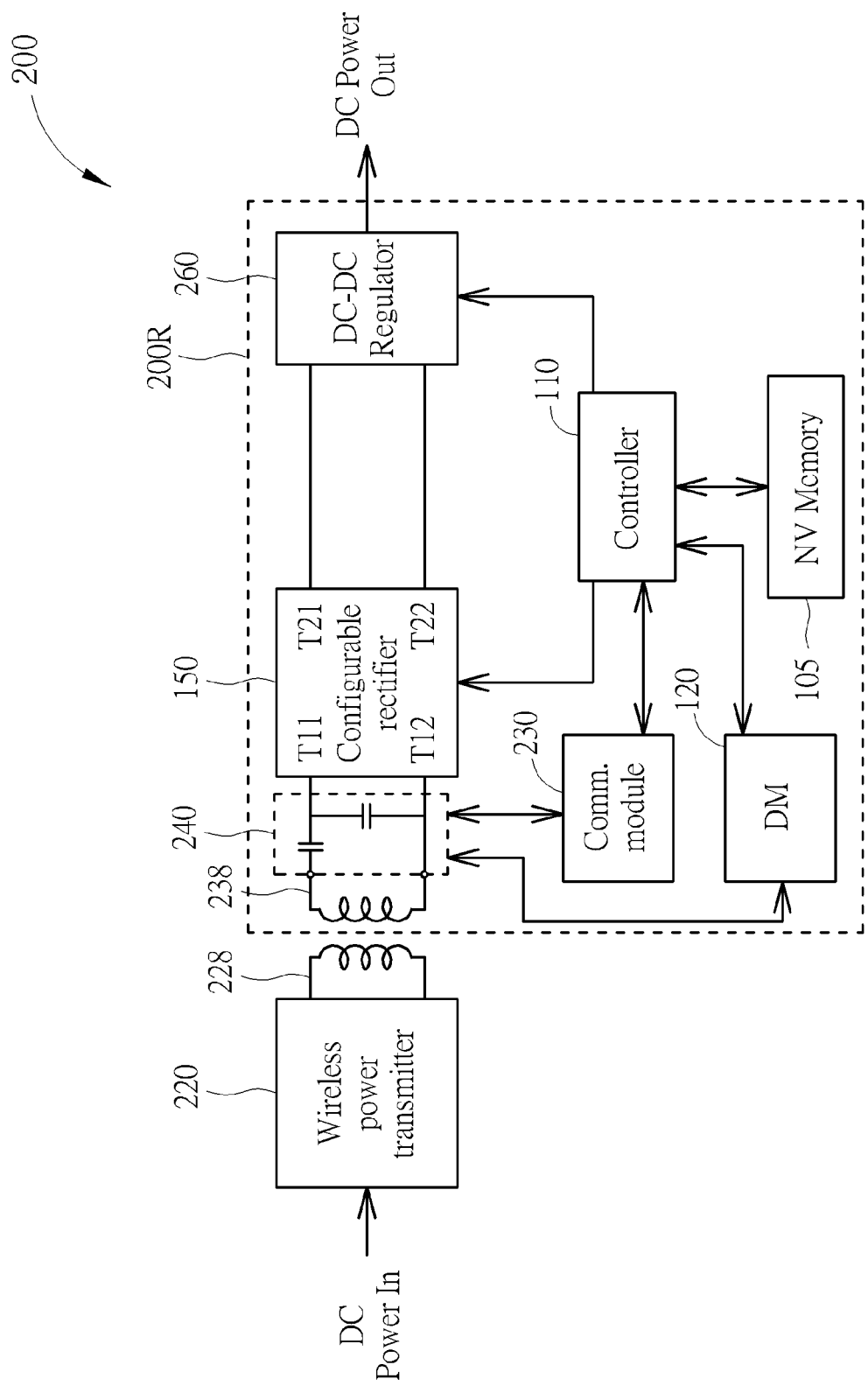
FIG. 2 is a diagram of a wireless power transfer system according to an embodiment of the present invention.

FIG. 2 is a diagram of a wireless power transfer system 200 according to an embodiment of the present invention. As shown in FIG. 2, the wireless power transfer system 200 may comprise a wireless power transmitter 220 equipped with a power output coil 228, and may further comprise a wireless charging receiver 200R, where the wireless charging receiver 200R can be taken as an example of the wireless charging receiver mentioned in the embodiment shown in FIG. 1. For better comprehension, the power output coil 228 can be illustrated outside the wireless power transmitter 220. This is for illustrative purposes only, and is not meant to be a limitation of the present invention. According to some variations of this embodiment, the power output coil 228 can be integrated into the wireless power transmitter 220.

According to this embodiment, the wireless charging receiver 200R may comprise the NV memory 105, the controller 110, the detection module 120 (labeled "DM" in FIG. 2, for brevity), and the configurable rectifier 150 in the architecture shown in FIG. 1, and may comprise the aforementioned communications module such as a communications module 230 (labeled "Comm. module" in FIG. 2, for brevity) and the aforementioned power input coil such as a power input coil 238, and may further comprise a matching circuit 240 and a DC-DC regulator 260. The configurable rectifier 150 can be regarded as an AC-DC convertor, where the configurable rectifier 150 may comprise a plurality of AC input terminals T11 and T12 arranged for receiving the AC input thereof, and may comprise some other terminals T21 and T22 arranged for providing the DC output thereof. As shown in FIG. 2, the DC-DC regulator 260 is coupled to the DC output terminal T21 of the configurable rectifier 150, and the two AC input terminals T11 and T12 of the configurable rectifier 150 are coupled to the two terminals of the power input coil 238. In this embodiment, the terminal T22 of the configurable rectifier 150 can be regarded as a ground terminal, and the two terminals T21 and T22 can be utilized for coupling the next stage such as the DC-DC regulator 260. More particularly, the configurable rectifier 150 may obtain the AC input from the power input coil 238 through the two AC input terminals T11 and T12, and rectifies the AC input to provide the DC output at the DC output terminal T21, such as a DC voltage level with respect to a ground voltage level at the terminal T22 (i.e. the ground terminal thereof). For example, the AC input can be obtained from the power input coil 238 when the electronic device is wirelessly charged through the power input coil 238 by the wireless power transmitter 220.

In practice, the matching circuit 240 may comprise some impedance components such as some capacitors. This is for illustrative purposes only, and is not meant to be a limitation of the present invention. In some examples, the DC-DC regulator 260 mentioned above can be a buck regulator. This is for illustrative purposes only, and is not meant to be a limitation of the present invention. Please note that the implementation of the DC-DC regulator 260 mentioned above may vary when needed. More particularly, in some other examples, the DC-DC regulator 260 mentioned above can be a low dropout (LDO) regulator.

According to this embodiment, the DC-DC regulator 260 can be utilized as the next stage of the configurable rectifier 150. This is for illustrative purposes only, and is not meant to be a limitation of the present invention. According to some variations of this embodiment, the DC-DC regulator 260 can be omitted, and some circuits of the electronic device mentioned above may directly utilize the aforementioned DC output such as the DC voltage level mentioned above.

Please note that, in the embodiment shown in FIG. 2, the apparatus 100 may comprise at least one portion (e.g. a portion or all) of the wireless power transfer system 200. For example, the apparatus 100 may comprise a portion of the wireless power transfer system 200, and more particularly, can be the wireless charging receiver 200R within the electronic device mentioned above, which means the apparatus 100 may comprise all components within the wireless charging receiver 200R shown in FIG. 2. In another example, the apparatus 100 may comprise a portion of the wireless power transfer system 200, and more particularly, can be the whole of the electronic device mentioned above, which means the apparatus 100 may comprise all components within the electronic device. In another example, the apparatus 100 can be the whole of the wireless power transfer system 200.

Based on the architecture shown in FIG. 2, electric power may be transferred from the left side (e.g. the input labeled "DC Power In" in the leftmost of FIG. 2) to the right side (e.g. the input labeled "DC Power Out" in the rightmost of FIG. 2) stage by stage. Suppose that the configurable rectifier 150 may be temporarily replaced by a conventional rectifier corresponding to a single rectifier size (e.g. the conventional rectifier is not configurable, and therefore can only operate with this single rectifier size thereof), and the wireless power transmitter 220 maybe selected from multiple wireless power transmitter products respectively corresponding to different wireless charging standards. In this situation, when the conventional rectifier is designed to minimize the power loss for one of the multiple wireless power transmitter products that corresponds to a first wireless charging specification, this single rectifier size of the conventional rectifier is determined (and manufactured) to correspond to a first transmitter frequency of the first wireless charging specification, rather than being determined (and manufactured) to correspond to a second transmitter frequency of the second wireless charging specification. As a result, when another of the multiple wireless power transmitter products that corresponds to the second wireless charging specification, rather than the one that corresponds to the first wireless charging specification, is selected as the wireless power transmitter 220, the power loss may increase, since this single rectifier size of the conventional rectifier cannot be changed once it is manufactured. Thus, the efficiency of the conventional rectifier can hardly be balanced between megahertz (MHz) and kilohertz (kHz) operations (i.e. the wireless charging operations at the frequencies of the order of Mhz and kHz, respectively), where the former is limited to switching loss, while the later is dominated by conduction loss. However, in the architecture shown in FIG. 2, the configurable rectifier 150 is equipped with the function of being configured to operate with one of the plurality of rectifier sizes. As a result of utilizing the architecture shown in FIG. 2, the power loss of the wireless charging receiver 200R may be always minimized, no matter whether the wireless charger complies with which of the aforementioned different wireless charging standards. Therefore, in a situation where the wireless power transfer system 200 is designed to be equipped with the capability of supporting various wireless charging standards, the apparatus 100 can optimize the efficiency of the wireless power receiver 200R, and more particularly, can optimize the efficiency of the configurable rectifier 150 in the wireless power receiver 200R.

Figure 3:
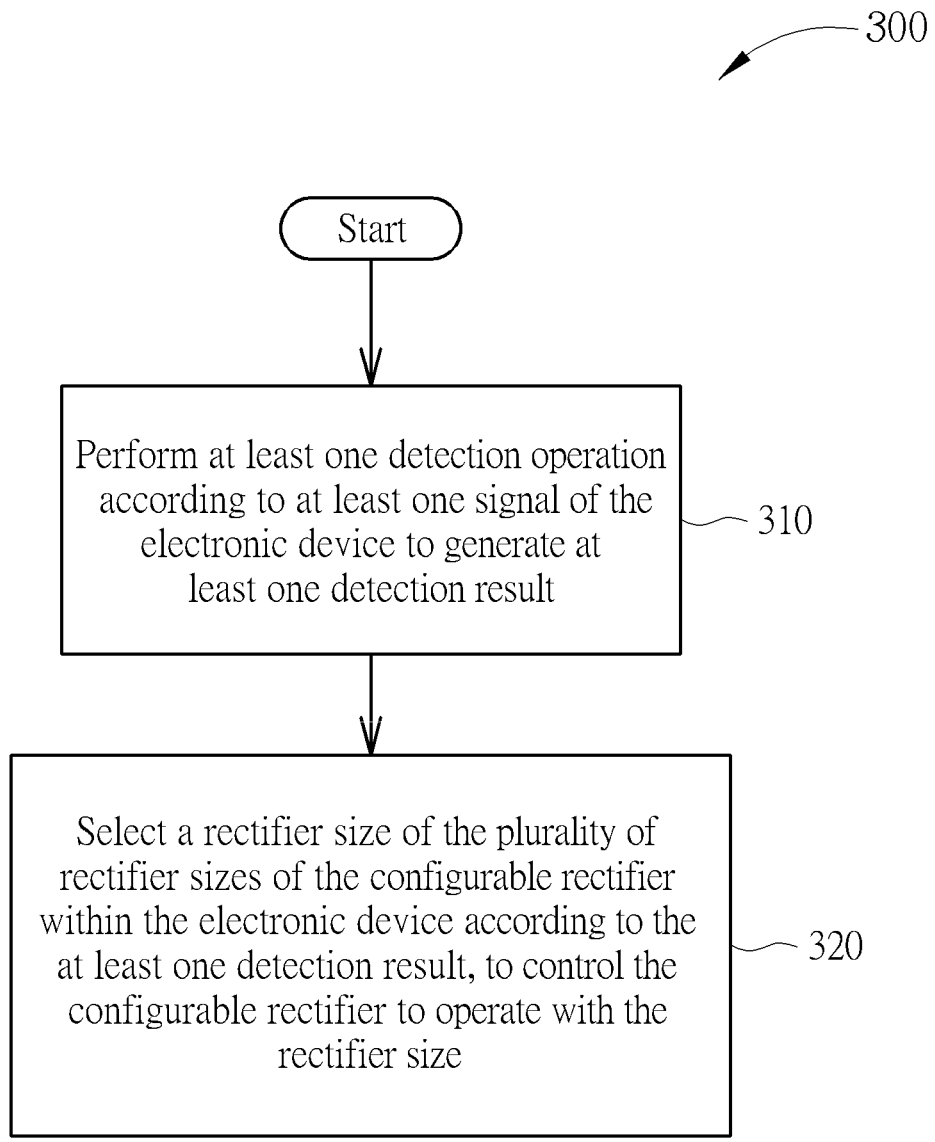
FIG. 3 illustrates a flowchart of a method for performing efficiency optimization of an electronic device according to an embodiment of the present invention.

FIG. 3 illustrates a flowchart of a method 300 for performing efficiency optimization of an electronic device according to an embodiment of the present invention. The method 300 shown in FIG. 3 can be applied to the apparatus 100 shown in FIG. 1 (more particularly, the wireless power transfer system 200 of the embodiment shown in FIG. 2), and can be applied to the controller 110 thereof. The method can be described as follows.

In Step 310, the detection module 120 performs at least one detection operation according to at least one signal of the electronic device to generate at least one detection result. For example, the aforementioned at least one detection operation, the aforementioned at least one signal, and the aforementioned at least one detection result within any of the previously described embodiments (e.g. any of the embodiments respectively shown in FIG. 1 and FIG. 2) can be taken as examples of that mentioned in Step 310, respectively.

In Step 320, the controller 110 selects a rectifier size of the plurality of rectifier sizes of the configurable rectifier 150 within the electronic device according to the aforementioned at least one detection result (more particularly, the detection result mentioned in Step 310), to control the configurable rectifier 150 to operate with the rectifier size (e.g. the rectifier size selected in Step 320), where the configurable rectifier 150 is arranged for performing rectification operations, and the configurable rectifier 150 is configurable to operate with at least one portion (e.g. a portion or all) of the configurable rectifier 150 being activated.

In practice, the configurable rectifier 150 may comprises the plurality of rectifier sub-circuits mentioned in the embodiment shown in FIG. 1, and the configurable rectifier 150 may be configurable to allow the plurality of rectifier sub-circuits being selectively activated or inactivated, respectively. In addition, the controller 110 may selectively activate or inactivate at least one rectifier sub-circuit of the plurality of rectifier sub-circuits according to the aforementioned at least one detection result, to control the configurable rectifier 150 to operate with the rectifier size (e.g. the rectifier size selected in Step 320).

According to some embodiments, the detection module 120 may perform one or a combination of a clock reconstruction operation, an in-band communications operation, an out-band communications operation, a wired communications operation, and a power line communications operation (e.g. one or more operations within the clock reconstruction operation, the in-band communications operation, the out-band communications operation, the wired communications operation, and the power line communications operation), to obtain the aforementioned at least one signal of the electronic device. According to some embodiments, the aforementioned at least one detection result may indicate the frequency of the wireless signals received by the power input coil 238 of the electronic device.

According to some embodiments, the aforementioned at least one signal of the electronic device may comprise at least one induced signal of the power input coil 238 of the electronic device or at least one derivative of the aforementioned at least one induced signal. In addition, in a situation where the configurable rectifier 150 is coupled to the power input coil 238 through the matching circuit 240 of the electronic device, the aforementioned at least one signal of the electronic device maybe obtained from two terminals between the matching circuit 240 and the configurable rectifier 150, such as the two AC input terminals T11 and T12 of the configurable rectifier 150.

According to some embodiments, based on the aforementioned at least one detection result, the controller 110 may configure the configurable rectifier 150 according to at least one predetermined relationship of the plurality of predetermined relationships between the plurality of rectifier sizes and the plurality of predetermined modes, where the plurality of predetermined modes may correspond to a plurality of operation modes of the electronic device. In practice, the plurality of predetermined relationships maybe implemented with at least one look up table (LUT) stored in the NV memory 105.

According to some embodiments, based on the aforementioned at least one detection result, the controller 110 may configure the configurable rectifier 150 according to at least one predetermined relationship of a plurality of predetermined size-frequency relationships between the plurality of rectifier sizes and a plurality of predetermined frequencies, where the aforementioned at least one detection result may indicate a frequency of the wireless signals received by the power input coil 230 of the electronic device, such as any of the transmitter frequencies respectively corresponding to different wireless charging standards, and therefore the controller 110 may configure the configurable rectifier 150 according to a predetermined relationship between a specific rectifier size of the plurality of rectifier sizes and a specific predetermined frequency of the plurality of predetermined frequencies. In practice, the plurality of predetermined size-frequency relationships may be implemented with at least one LUT (e.g. one or more LUTs) stored in the NV memory 105.

Figure 4:
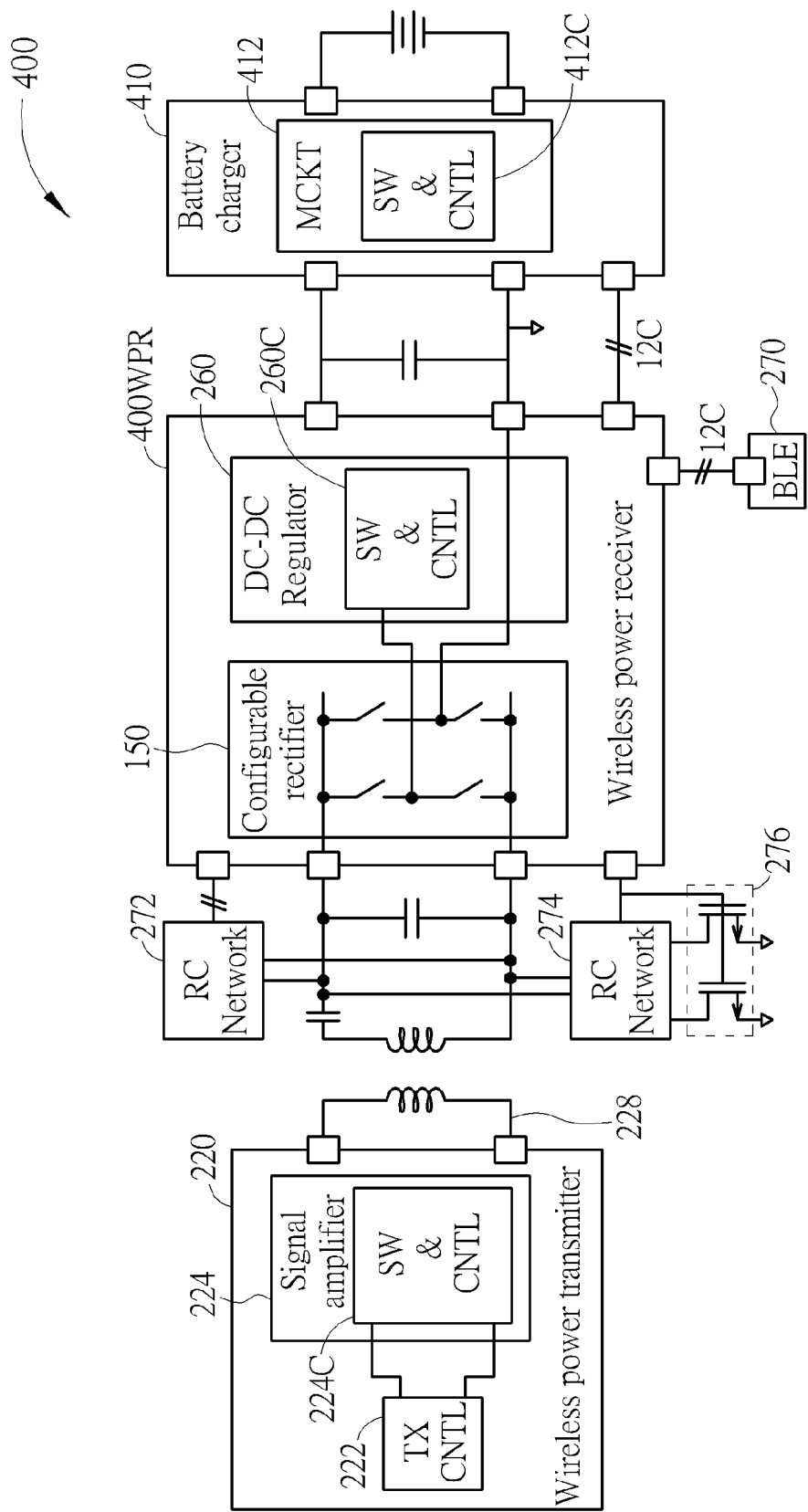
FIG. 4 illustrates a mode selection control scheme involved with the method shown in FIG. 3 according to an embodiment of the present invention.

FIG. 4 illustrates a mode selection control scheme involved with the method 300 shown in FIG. 3 according to an embodiment of the present invention. As shown in FIG. 4, in addition to the wireless power transmitter 220 and the wireless charging receiver 200R, the wireless power transfer system 400 may comprise a battery charger 410. The wireless power transmitter 220 of this embodiment may comprise a transmitter control circuit 222 (labeled "TX CNTL" in FIG. 4, for brevity) and a signal amplifier 224, and the signal amplifier 224 may comprise a switching and control circuit 224C (labeled "SW & CNTL" in FIG. 4, for brevity), where the wireless power transmitter 220 maybe implemented with a single semiconductor chip. In addition, the wireless charging receiver 200R of this embodiment may comprise a wireless power receiver 400WPR and a Bluetooth Low Energy (BLE) circuit 270, and the DC-DC regulator 260 may comprise a switching and control circuit 260C (labeled "SW & CNTL" in FIG. 4, for brevity), where each of the wireless power receiver 400WPR and the BLE circuit 270 may be implemented with a single semiconductor chip. As shown in FIG. 4, the wireless charging receiver 200R may comprise some resistor-capacitor (RC) networks 272 and 274, and may further comprise associated circuits 276. Additionally, the battery charger 410 may comprise a main circuit 412 (labeled "Main CKT" in FIG. 4, for brevity), and the main circuit 412 may comprise a switching and control circuit 412C (labeled "SW & CNTL" in FIG. 4, for brevity), where the main circuit 412 maybe implemented with a single semiconductor chip. Please note that the notation "I2C" stands for Inter-Integrated Circuit, and each of the buses labeled "I2C" in FIG. 4 may comply with the I2C specifications.

According to this embodiment, in a situation where the aforementioned at least one detection result in Step 310 indicates the frequency of the wireless signals received by the power input coil 230 of the electronic device and this frequency is equal to the specific predetermined frequency of the plurality of predetermined frequencies, the controller 110 may configure the configurable rectifier 150 according to the predetermined relationship between the specific rectifier size and the specific predetermined frequency, to operate with the specific rectifier size. For example, when this frequency falls within the predetermined frequency range of the WPC Qi V1.1 standard (e.g. from 100 kHz to 200 kHz), the controller 110 may determine the specific rectifier size to be a first size of the configurable rectifier 150 according to the aforementioned at least one LUT, and may configure the configurable rectifier 150 to operate with the first size, where the first size is optimized for the predetermined frequency range of the WPC Qi V1.1 standard. In another example, when this frequency falls within the predetermined frequency range of the PMA standard (e.g. from 200 kHz to 300 kHz), the controller 110 may determine the specific rectifier size to be a second size of the configurable rectifier 150 according to the aforementioned at least one LUT, and may configure the configurable rectifier 150 to operate with the second size, where the second size is optimized for the predetermined frequency range of the PMA standard. In another example, when this frequency is equivalent to the predetermined frequency of the A4WP standard (e.g. 6.78 MHz), the controller 110 may determine the specific rectifier size to be a third size of the configurable rectifier 150 according to the aforementioned at least one LUT, and may configure the configurable rectifier 150 to operate with the third size, where the third size is optimized for the predetermined frequency of the A4WP standard. In another example, when this frequency is equivalent to the predetermined frequency of the Near Field Communication (NFC)-like architecture (e.g. 13.56 MHz), the controller 110 may determine the specific rectifier size to be a fourth size of the configurable rectifier 150 according to the aforementioned at least one LUT, and may configure the configurable rectifier 150 to operate with the fourth size, where the fourth size is optimized for the predetermined frequency of the NFC-like architecture. Thus, no matter which of the multiple wireless power transmitter products respectively corresponding to the aforementioned different wireless charging standards is selected as the wireless power transmitter 220, the apparatus 100 can optimize the efficiency of the wireless power receiver 200R, and more particularly, can optimize the efficiency of the configurable rectifier 150 in the wireless power receiver 200R.

Figure 5:
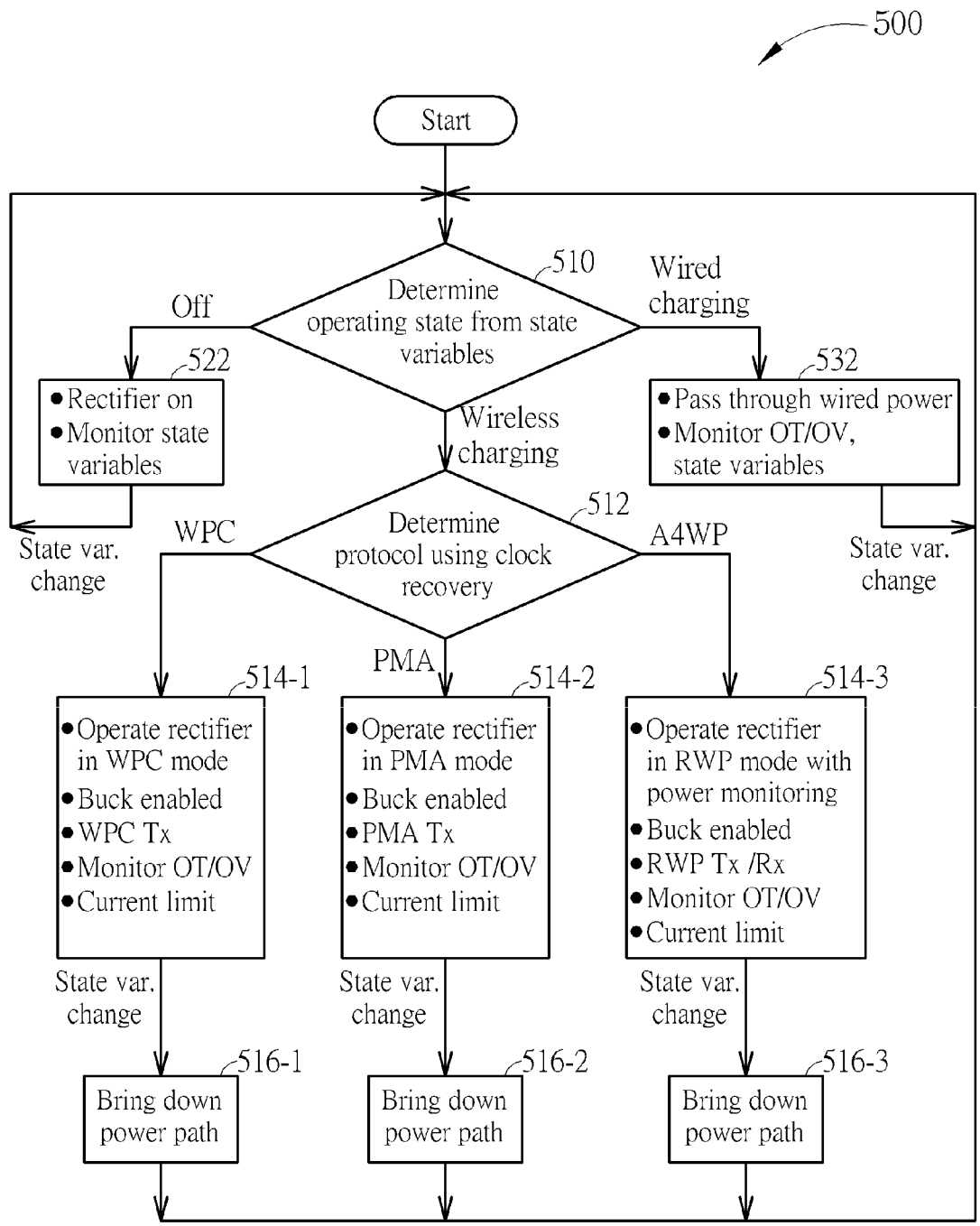
FIG. 5 illustrates a working flow involved with the method shown in FIG. 3 according to an embodiment of the present invention.

FIG. 5 illustrates a working flow 500 involved with the method 300 shown in FIG. 3 according to an embodiment of the present invention. For example, the working flow 500 may start in response to the reset operation of the wireless power transfer system 400.

In Step 510, the controller 110 may determine the operating state of the wireless power transfer system 400 from some state variables of the wireless power transfer system 400. In a situation where the operating state is a wireless charging state for wireless charging, Step 512 is entered. In a situation where the operating state is an off state, Step 522 is entered. In a situation where the operating state is a wired charging state for wired charging, Step 532 is entered.

In Step 512, the controller 110 may determine the protocol (e.g. the protocol of wireless charging) by using clock recovery. In a situation where the protocol corresponds to the WPC Qi V1.1 standard, Step 514-1 is entered for WPC charging. In a situation where the protocol corresponds to the PMA standard, Step 514-2 is entered for PMA charging. In a situation where the protocol corresponds to the A4WP standard, Step 514-3 is entered for Resonant Wireless Power (RWP) charging (or A4WP charging).

In Step 514-1, the controller 110 may operate the rectifier such as the configurable rectifier 150 in a WPC mode, enable the main circuit 412 such as a buck regulator (labeled "Buck enabled" in FIG. 5, for brevity), perform WPC transmitting operations (labeled "WPC Tx" in FIG. 5, for brevity), monitor OT/OV parameters, and perform current limit operations. For example, the controller 110 may configure the configurable rectifier 150 to operate with the first size, where the first size is optimized for the predetermined frequency range of the WPC Qi V1.1 standard.

In Step 516-1, in response to the change of one or more state variables (labeled "State var. change" in FIG. 5, for brevity), the controller 110 may bring down the power path.

In Step 514-2, the controller 110 may operate the rectifier such as the configurable rectifier 150 in a PMA mode, enable the main circuit 412 such as the buck regulator (labeled "Buck enabled" in FIG. 5, for brevity), perform PMA transmitting operations (labeled "PMA Tx" in FIG. 5, for brevity), monitor OT/OV parameters, and perform current limit operations. For example, the controller 110 may configure the configurable rectifier 150 to operate with the second size, where the second size is optimized for the predetermined frequency range of the PMA standard.

In Step 516-2, in response to the change of one or more state variables (labeled "State var. change" in FIG. 5, for brevity), the controller 110 may bring down the power path.

In Step 514-3, the controller 110 may operate the rectifier such as the configurable rectifier 150 in a RWP mode with power monitoring, enable the main circuit 412 such as the buck regulator (labeled "Buck enabled" in FIG. 5, for brevity), perform RWP transmitting/receiving operations (labeled "RWP Tx/Rx" in FIG. 5, for brevity), monitor OT/OV parameters, and perform current limit operations. For example, the controller 110 may configure the configurable rectifier 150 to operate with the third size, where the third size is optimized for the predetermined frequency range of the A4WP standard.

In Step 516-3, in response to change(s) of one or more state variables (labeled "State var. change" in FIG. 5, for brevity), the controller 110 may bring down the power path.

In Step 522, the controller 110 may turn on the rectifier such as the configurable rectifier 150 (labeled "Rectifier on" in FIG. 5, for brevity), and monitor state variables. As a result, change(s) of one or more state variables (labeled "State var. change" in FIG. 5, for brevity) may occur. Afterward, Step 510 may be re-entered.

In Step 532, the controller 110 may control the apparatus 100 to pass through wired power, and monitor OT/OV parameters and state variables. As a result, change(s) of one or more state variables (labeled "State var. change" in FIG. 5, for brevity) may occur. Afterward, Step 510 may be re-entered.

Figure 6:
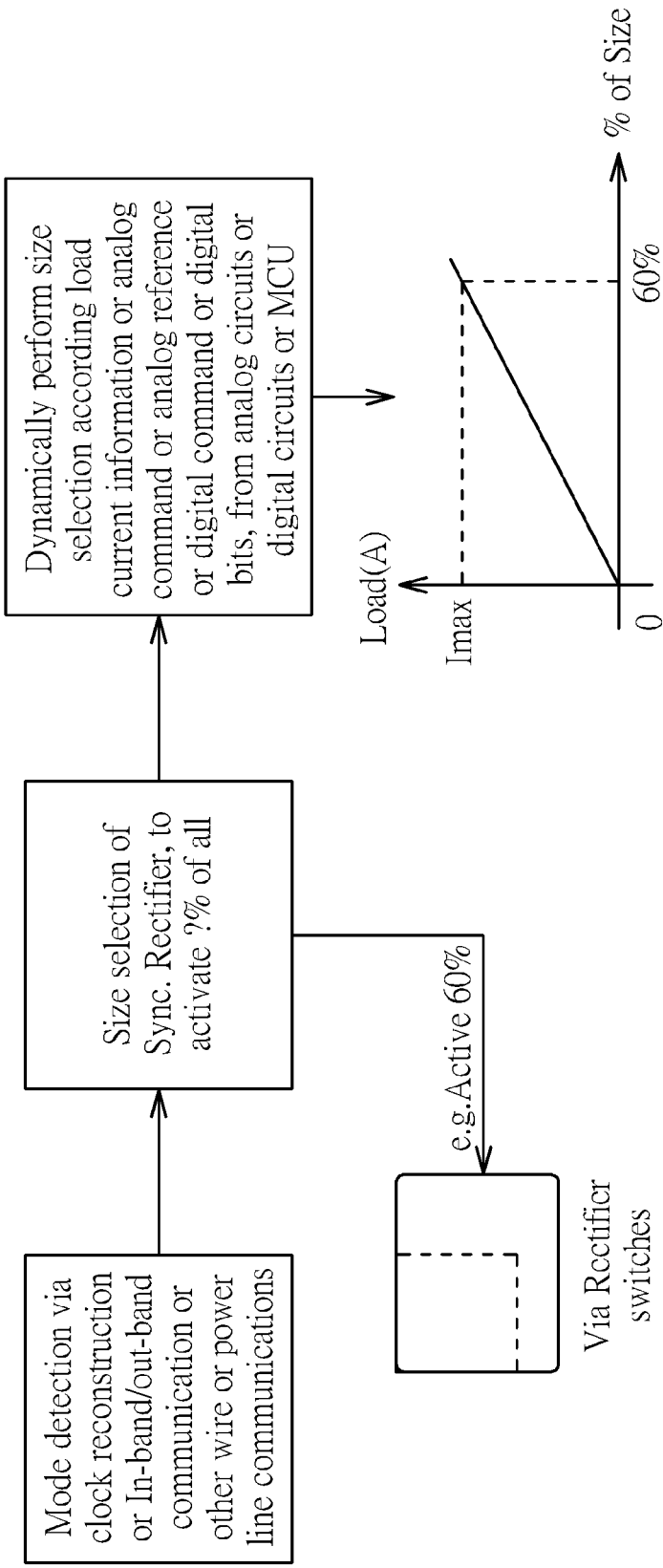
FIG. 6 illustrates a rectifier size control scheme involved with the method shown in FIG. 3 according to an embodiment of the present invention.

FIG. 6 illustrates a rectifier size control scheme involved with the method 300 shown in FIG. 3 according to an embodiment of the present invention. For example, the controller 110 may control the apparatus 100 to perform mode detection via one or a combination of the clock reconstruction operation, the in-band communications operation, the out-band communications operation, the wired communications operation, and the power line communications operation, to obtain the aforementioned at least one signal of the electronic device. Then, the controller 110 may perform size selection of the configurable rectifier 150 such as a synchronous (Sync.) rectifier, to activate a certain percentage (labeled "?%" in FIG. 6, for brevity) of all of the configurable rectifier 150. For example, the controller 110 may activate 60% of the configurable rectifier 150 (labeled "Active 60%" in FIG. 6, for brevity) by using one or more of a plurality of rectifier switches in the configurable rectifier 150, where the plurality of rectifier switches may be arranged for selectively activating or inactivating the plurality of rectifier sub-circuits, respectively, under control of the controller 110. Examples of the plurality of rectifier switches may include, but not limited to, Metal Oxide Semiconductor Field Effect Transistor (MOSFET).

In practice, the controller 110 may dynamically perform size selection according to one or a combination of load current information, an analog command, an analog reference, a digital command, and a set of digital bits, for example, from analog circuits or digital circuits or a micro control unit (MCU). In some embodiments, the MCU can be taken as an example of the controller 110. As shown in FIG. 6, the horizontal axis may represent the percentage (%) of size, such as the percentage obtained from dividing one of the plurality of rectifier sizes by the maximum rectifier size within the plurality of rectifier sizes, and the vertical axis may represent the current load (labeled "Load" in FIG. 6, for brevity) in units of Ampere (A), such as the amount of electrical current passing from the configurable rectifier 150 to the device receiving the power (e.g. the current that is output through the DC output terminal T21 of the configurable rectifier 150). For example, the notation "Imax" may indicate the current corresponding to the size percentage of 60%.

Figure 7:
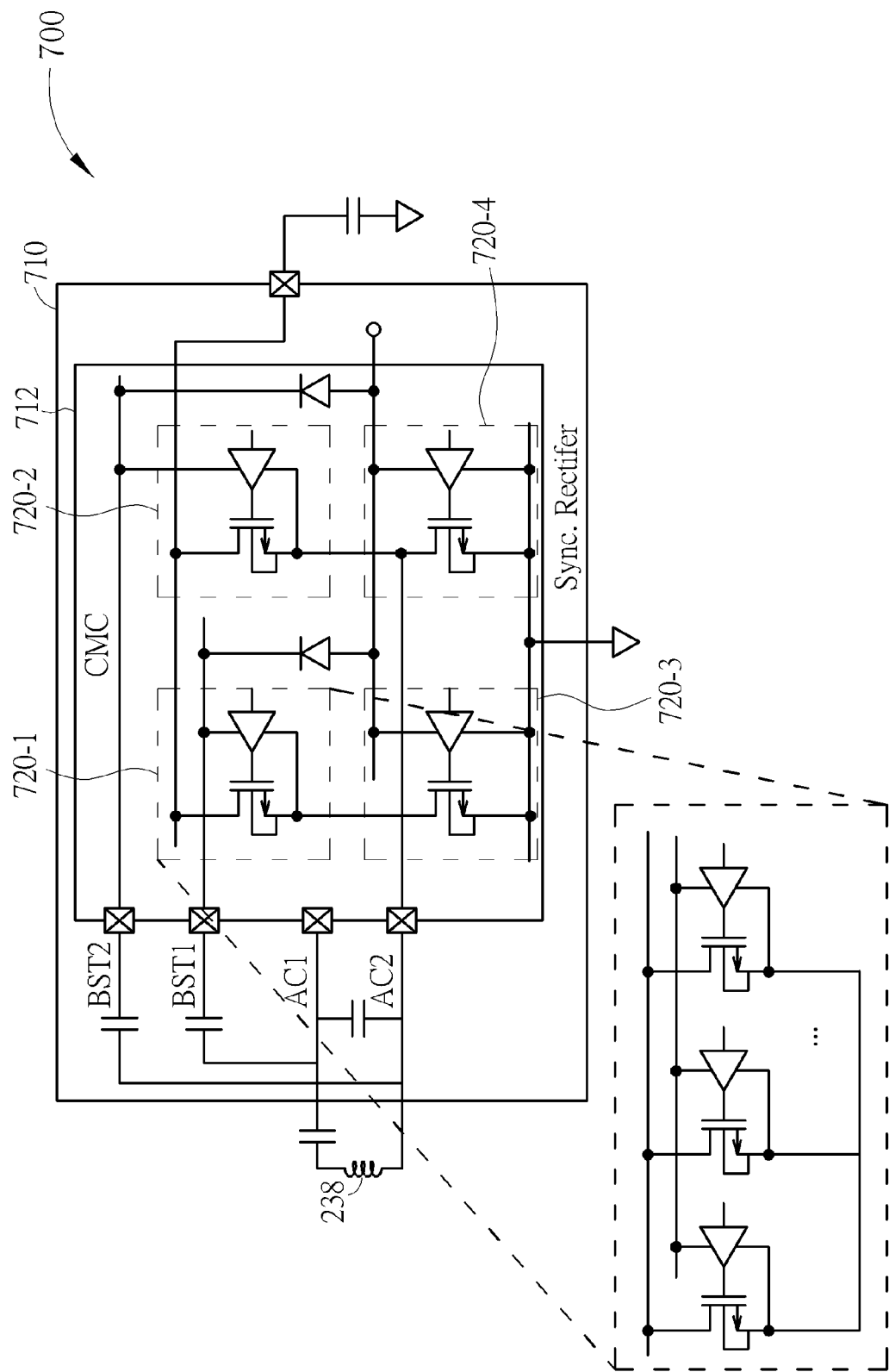
FIG. 7 illustrates some implementation details of a configurable rectifier involved with the method shown in FIG. 3 according to an embodiment of the present invention.

FIG. 7 illustrates some implementation details of the configurable rectifier 150 involved with the method 300 shown in FIG. according to an embodiment of the present invention. The architecture 700 shown in FIG. 7 may comprise a synchronous (Sync.) rectifier 710, which can be taken as an example of the configurable rectifier 150, and may further comprise the power input coil 238 and at least one component of the matching circuit 240 (e.g. a capacitor coupled to the power input coil 238). In addition, the synchronous rectifier 710 may comprise a configurable main circuit 712 (labeled "CMC" in FIG. 7, for brevity), which may comprise a plurality of input terminals AC1, AC2, BST1, and BST2 and may further comprise a plurality of configurable modules 720-1, 720-2, 720-3, and 720-4.

As shown in the lower half of FIG. 7, each configurable module 720-i of the plurality of configurable modules 720-1, 720-2, 720-3, and 720-4 (e.g. the index i may represent a positive integer that falls within the range of the interval [1, 4]), such as configurable module 720-1, may comprise a set of multiple sets of rectifier sub-circuits within the plurality of rectifier sub-circuits. For example, the configurable module 720-1 may comprise a first set of rectifier sub-circuits within the plurality of rectifier sub-circuits, the configurable module 720-2 may comprise a second set of rectifier sub-circuits within the plurality of rectifier sub-circuits, the configurable module 720-3 may comprise a third set of rectifier sub-circuits within the plurality of rectifier sub-circuits, and the configurable module 720-4 may comprise a fourth set of rectifier sub-circuits within the plurality of rectifier sub-circuits. As the rectifier sub-circuits in each set of the multiple sets of rectifier sub-circuits (e.g. any set within the first set of rectifier sub-circuits, the second set of rectifier sub-circuits, the third set of rectifier sub-circuits, and the fourth set of rectifier sub-circuits) may be selectively activated or inactivated, respectively, the configurable rectifier 150 may be set to operate (e.g. perform rectification operations) with one of the plurality of rectifier sizes (which are typically different from each other) when needed. For brevity, similar descriptions for this embodiment are not repeated in detail here.

Figure 8:
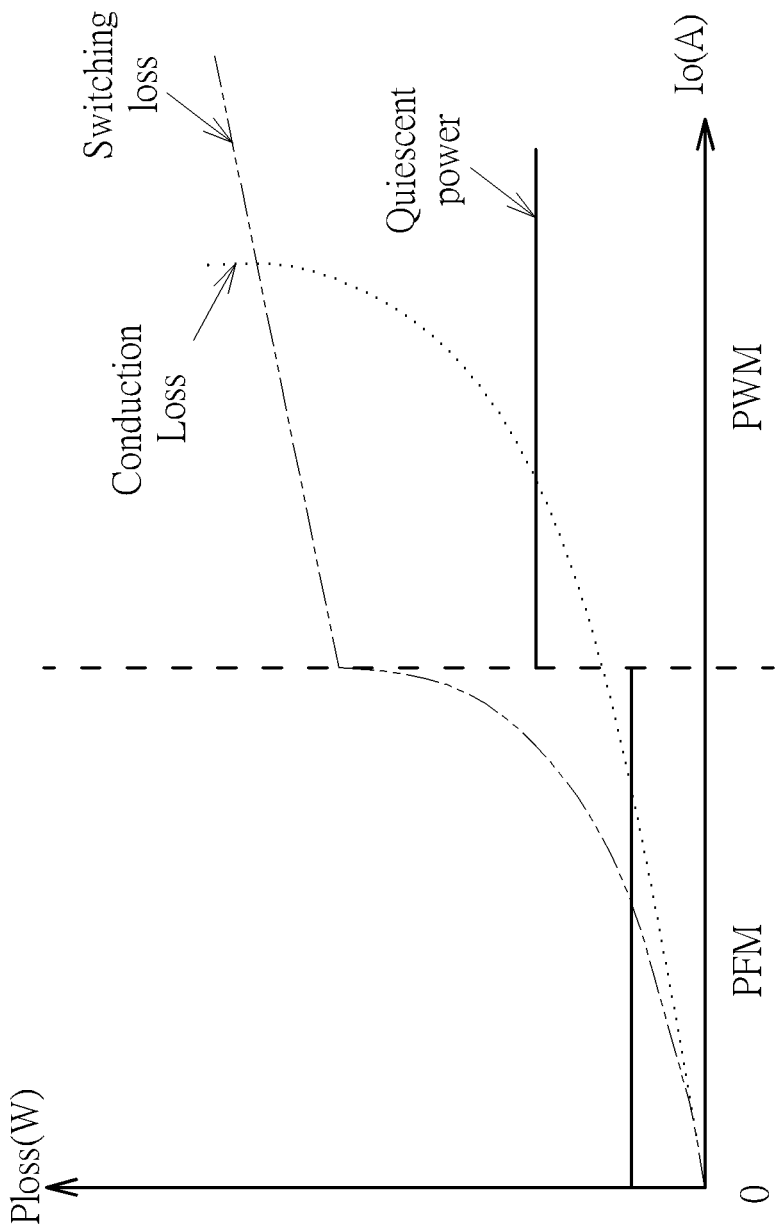
FIG. 8 illustrates at least one efficiency optimization point involved with the method shown in FIG. 3 according to an embodiment of the present invention.

FIG. 8 illustrates at least one efficiency optimization point involved with the method 300 shown in FIG. 3 according to an embodiment of the present invention. As shown in FIG. 8, the horizontal axis may represent the DC output current Io of the configurable rectifier 150 in units of A, and the vertical axis may represent the power loss Ploss of the configurable rectifier 150 in units of Watt (W). The curve labeled "Conduction loss" indicates that the conduction loss of the configurable rectifier 150 may increase as the DC output current Io increases. In addition, the curve labeled "Switching loss" indicates that the switching loss of the configurable rectifier 150 may increase rapidly as the DC output current Io increases within the Pulse-Frequency Modulation (PFM) phase, and that the switching loss of the configurable rectifier 150 may increase in a linear manner (with an offset) within the Pulse-Width Modulation (PWM) phase, where the notations PFM and PWM shown in FIG. 8 may represent the PFM phase and the PWM phase, respectively. Additionally, the curve labeled "Quiescent power" indicates that the quiescent power of the configurable rectifier 150 may be equivalent to different fixed values in the PFM phase and the PWM phase, respectively, where the quiescent power may represent the power consumed by the configurable rectifier 150 without any loading coupled to the DC output terminal T21 of the configurable rectifier 150. For example, regarding the quiescent power, a first fixed value corresponding to the PFM phase is less than a second fixed value corresponding to the PWM phase.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing efficiency optimization of an electronic device, the method comprising the steps of: performing at least one detection operation according to at least one signal of the electronic device to generate at least one detection result, wherein the at least one detection result indicates a frequency of a wireless signal received by a power input coil of the electronic device; and selecting a rectifier size of a plurality of rectifier sizes of a configurable rectifier within the electronic device according to the at least one detection result, to control the configurable rectifier to operate with the rectifier size, the rectifier size being selected by activating a number of rectifier-sub circuits of the configurable rectifier, wherein the configurable rectifier is arranged for performing rectification operations, and the configurable rectifier is configurable to operate with at least one portion of the configurable rectifier being activated.

2. The method of claim 1, wherein the configurable rectifier comprises a plurality of rectifier sub-circuits; and the configurable rectifier is configurable to allow the plurality of rectifier sub-circuits being selectively activated or inactivated, respectively.

3. The method of claim 1, wherein the configurable rectifier comprises a plurality of rectifier sub-circuits; and the step of selecting the rectifier size of the plurality of rectifier of the rectifier sizes of the configurable rectifier within the electronic device according to the at least one detection result to control the configurable rectifier to operate with the rectifier size further comprises: selectively activating or inactivating at least one rectifier sub-circuit of the plurality of rectifier sub-circuits according to the at least one detection result, to control the configurable rectifier to operate with the rectifier size.

4. The method of claim 1, wherein the step of performing the at least one detection operation according to the at least one signal of the electronic device to generate the at least one detection result further comprises: performing one or a combination of a clock reconstruction operation, an in-band communications operation, an out-band communications operation, a wired communications operation, and a power line communications operation, to obtain the at least one signal of the electronic device.

5. The method of claim 1, wherein the at least one signal of the electronic device comprises at least one induced signal of a power input coil of the electronic device or at least one derivative of the at least one induced signal; the configurable rectifier is coupled to thepower input coil through amatching circuit of the electronic device; and the at least one signal of the electronic device is obtained from two terminals between the matching circuit and the configurable rectifier.

6. The method of claim 5, wherein the two terminals between the matching circuit and the configurable rectifier are two alternating current (AC) input terminals of the configurable rectifier.

7. The method of claim 1, wherein the step of selecting the rectifier size of the plurality of rectifier sizes of the configurable rectifier within the electronic device according to the at least one detection result to control the configurable rectifier to operate with the rectifier size further comprises: based on the at least one detection result, configuring the configurable rectifier according to at least one predetermined relationship of a plurality of predetermined relationships between the plurality of rectifier sizes and a plurality of predetermined modes.

8. The method of claim 7, wherein the plurality of predetermined modes corresponds to a plurality of operation modes of the electronic device.

9. The method of claim 1, wherein the step of selecting the rectifier size of the plurality of rectifier sizes of the configurable rectifier within the electronic device according to the at least one detection result to control the configurable rectifier to operate with the rectifier size further comprises: based on the at least one detection result, configuring the configurable rectifier according to at least one predetermined relationship of a plurality of predetermined size-frequency relationships between the plurality of rectifier sizes and a plurality of predetermined frequencies.

10. An apparatus for performing efficiency optimization of an electronic device, the apparatus comprising at least one portion of the electronic device, the apparatus comprising: a detection module, positioned within the electronic device, arranged for performing at least one detection operation according to at least one signal of the electronic device to generate at least one detection result, wherein the at least one detection result indicates a frequency of a wireless signal received by a power input coil of the electronic device; a configurable rectifier, positioned within the electronic device, arranged for performing rectification operations, wherein the configurable rectifier is configurable to operate with at least one portion of the configurable rectifier being activated; and a controller, coupled to the detection module and the configurable rectifier, arranged for selecting a rectifier size of a plurality of rectifier sizes of the configurable rectifier according to the at least one detection result, to control the configurable rectifier to operate with the rectifier size, the rectifier size being selected by activating a number of rectifier-sub circuits of the configurable rectifier.

11. The apparatus of claim 10, wherein the configurable rectifier comprises a plurality of rectifier sub-circuits; and the configurable rectifier is configurable to allow the plurality of rectifier sub-circuits being selectively activated or inactivated, respectively.

12. The apparatus of claim 10, wherein the configurable rectifier comprises a plurality of rectifier sub-circuits; and the controller selectively activates or inactivates at least one rectifier sub-circuit of the plurality of rectifier sub-circuits according to the at least one detection result, to control the configurable rectifier to operate with the rectifier size.

13. The apparatus of claim 10, wherein the detection module performs one or a combination of a clock reconstruction operation, an in-band communications operation, an out-band communications operation, a wired communications operation, and a power line communications operation, to obtain the at least one signal of the electronic device.

14. The apparatus of claim 10, wherein the at least one signal of the electronic device comprises at least one induced signal of a power input coil of the electronic device or at least one derivative of the at least one induced signal; the configurable rectifier is coupled to the power input coil through a matching circuit of the electronic device; and the at least one signal of the electronic device is obtained from two terminals between the matching circuit and the configurable rectifier.

15. The apparatus of claim 14, wherein the two terminals between the matching circuit and the configurable rectifier are two alternating current (AC) input terminals of the configurable rectifier.

16. The apparatus of claim 10, wherein based on the at least one detection result, the controller configures the configurable rectifier according to at least one predetermined relationship of a plurality of predetermined relationships between the plurality of rectifier sizes and a plurality of predetermined modes.

17. The apparatus of claim 10, wherein based on the at least one detection result, the controller configures the configurable rectifier according to at least one predetermined relationship of a plurality of predetermined relationships between the plurality of rectifier sizes and a plurality of predetermined modes.

18. The apparatus of claim 10, wherein based on the at least one detection result, the controller configures the configurable rectifier according to at least onepredetermined relationship of a plurality of predetermined size-frequency relationships between the plurality of rectifier sizes and a plurality of predetermined frequencies.

19. An apparatus for improving efficiency of an electronic device, the apparatus comprising atleast one portion of the electronic device, the apparatus further comprising:
  a controller, coupled to a detection module and a configurable rectifier, arranged forselecting a rectifier sizeof aplurality of rectifier sizes of a configurable rectifier according to at least one detection result indicating a frequency of wireless signals received by a power input coil of the electronic device, to control the configurable rectifier to operate with the selected rectifier size, the rectifier size being selected by activating a number of rectifier-sub circuits of the configurable rectifier.

* * * * *

UNITED STATES PATENT AND TRADEMARK OFFICE
CERTIFICATE OF CORRECTION

PATENT NO. : 9,923,384 B2
APPLICATION NO. : 14/715570
DATED : March 20, 2018
INVENTOR(S) : Hung-Chih Lin et al.

Page 1 of 1

It is certified that error appears in the above-identified patent and that said Letters Patent is hereby corrected as shown below:

In the Claims

Claim 3, at Column 13, Lines 30-31, delete "of rectifier"

Signed and Sealed this
Twenty-sixth Day of February, 2019

Andrei Iancu
*Director of the United States Patent and Trademark Office*